(12) United States Patent
Choi et al.

(10) Patent No.: US 11,044,284 B2
(45) Date of Patent: Jun. 22, 2021

(54) COMMON INTEREST NETWORK FOR SHARING INFORMATION

(71) Applicant: NAVER Corporation, Seongnam-si (KR)

(72) Inventors: Jae Keol Choi, Seongnam-si (KR); Jaeho Choi, Seongnam-si (KR); Inho Kang, Seongnam-si (KR); Donghee Sung, Seongnam-si (KR)

(73) Assignee: NAVER CORPORATION, Gyeonggi-Do (KR)

( * ) Notice: Subject to any disclaimer, the term of this patent is extended or adjusted under 35 U.S.C. 154(b) by 729 days.

(21) Appl. No.: 15/067,871

(22) Filed: Mar. 11, 2016

(65) Prior Publication Data

US 2016/0269454 A1    Sep. 15, 2016

(30) Foreign Application Priority Data

Mar. 13, 2015    (KR) .................. 10-2015-0035125

(51) Int. Cl.
*G06F 15/16* (2006.01)
*H04L 29/06* (2006.01)
(Continued)

(52) U.S. Cl.
CPC ........ *H04L 65/403* (2013.01); *G06F 16/9038* (2019.01); *G06Q 10/10* (2013.01);
(Continued)

(58) Field of Classification Search
CPC ....... H04L 65/403; H04L 67/22; H04L 67/26; G06F 17/30991; G06Q 10/10; G06Q 30/01
See application file for complete search history.

(56) References Cited

U.S. PATENT DOCUMENTS 6,029,195 A * 2/2000 Herz ............... G06Q 30/02
                                                    725/116
9,110,953 B2 * 8/2015 Steinberg ........... H04N 21/454
(Continued)

FOREIGN PATENT DOCUMENTS

CN    102779122 A    11/2012
JP    2001350794 A    12/2001
(Continued)

OTHER PUBLICATIONS

Korean Office Action dated Apr. 13, 2016 and issued in corresponding Korean patent application No. 10-2015-0035125.
(Continued)

*Primary Examiner* — Alan S Chou
(74) *Attorney, Agent, or Firm* — Harness, Dickey & Pierce, P.L.C.

(57) ABSTRACT

A method of sharing information includes: determining, in response to input of a keyword, whether a common interest network corresponding to the keyword exists; generating the common interest network corresponding to the keyword in response to determining that the common interest network corresponding to the keyword does not exist; locating first common content associated with the keyword; and outputting the located first common content to the generated common interest network corresponding to the keyword. The located first common content may be output to the generated common interest network in real time.

28 Claims, 14 Drawing Sheets

(51) Int. Cl.
    *G06F 16/9038*     (2019.01)
    *H04L 29/08*     (2006.01)
    *G06Q 50/00*     (2012.01)
    *G06Q 10/10*     (2012.01)

(52) U.S. Cl.
    CPC ............ *G06Q 50/01* (2013.01); *H04L 67/22* (2013.01); *H04L 67/26* (2013.01)

(56) References Cited

U.S. PATENT DOCUMENTS

| | | | |
|---|---|---|---|
| 9,134,875 B2* | 9/2015 | Falaki | G06F 13/00 |
| 9,264,463 B2* | 2/2016 | Rubinstein | H04L 65/403 |
| 2008/0222295 A1* | 9/2008 | Robinson | G06F 17/30867 |
| | | | 709/227 |
| 2009/0034931 A1* | 2/2009 | Stone | G11B 19/025 |
| | | | 386/239 |
| 2011/0173281 A1* | 7/2011 | Smith | G06Q 10/10 |
| | | | 709/206 |
| 2014/0067967 A1* | 3/2014 | Jackson | G06Q 30/0269 |
| | | | 709/206 |
| 2015/0206183 A1* | 7/2015 | Zhou | G06Q 30/0255 |
| | | | 705/14.53 |
| 2020/0058080 A1* | 2/2020 | Vasthimal | G06Q 50/01 |

FOREIGN PATENT DOCUMENTS

| | | |
|---|---|---|
| JP | 2008537810 A | 9/2008 |
| KR | 2010-0036486 A | 4/2010 |
| KR | 2012-0018708 A | 3/2012 |
| KR | 2015-0015058 A | 2/2015 |
| KR | 2015-0021979 A | 3/2015 |

OTHER PUBLICATIONS

Japanese Office Action dated Jan. 4, 2017 in Japanese Application No. 2016-050036.
Chinese Office Action dated Nov. 2, 2018 by the Chinese Patent Office in Chinese Patent Appl. No. 201610136369.4.

* cited by examiner

COMMON INTEREST NETWORK FOR SHARING INFORMATION

CROSS-REFERENCE TO RELATED APPLICATION(S)

This application claims priority under 35 U.S.C. § 119 to Korean Patent Application No. 10-2015-0035125, filed Mar. 13, 2015, in the Korean Intellectual Property Office (KIPO), the entire contents of which are incorporated herein by reference.

BACKGROUND

1. Field

One or more example embodiments relate to technology for providing information about specific keywords, and more particularly, to methods and/or systems for sharing information between users.

2. Description of Related Art

Recently, with the generalization of the Internet, information can be shared over a network, and information searching through the Internet is increasing. Search sites provide users with an input box for inputting a keyword, search for information on the Internet based on the input keyword, and provide information desired by the user.

SUMMARY

One or more example embodiments may provide technology that enables users to acquire desired search results and share common interests by providing network environments corresponding to keywords input from the users in real time.

One or more example embodiments provide information sharing systems capable of generating a common interest network associated with a keyword and/or providing a space in which users may share information in real time.

One or more example embodiments also provide information sharing systems that may select content created through a common interest network and determine a ranking of the content in real time.

At least one example embodiment provides a method of sharing information, the method comprising: determining, in response to input of a keyword, whether a common interest network corresponding to the keyword exists; generating the common interest network corresponding to the keyword in response to determining that the common interest network corresponding to the keyword does not exist; locating first common content associated with the keyword; and outputting the located first common content to the generated common interest network corresponding to the keyword.

At least one other example embodiment provides a non-transitory computer-readable recording medium including instructions that, when executed, control a computer system to perform a method for sharing information, the method comprising: determining, in response to input of a keyword, whether a common interest network corresponding to the keyword exists; generating the common interest network corresponding to the keyword in response to determining that the common interest network corresponding to the keyword does not exist; locating first common content associated with the keyword; and outputting the located first common content to the generated common interest network corresponding to the keyword.

According to at least some example embodiments, the method may further include outputting, to the generated common interest network, second common content associated with the keyword, the second common content created through a content creation interface.

The method may further include providing the content creation interface for creating the second common content; and creating the second common content based on content creation information input through the content creation interface.

The method may further include sharing a user opinion by displaying a detail page associated with a common content selected from among the first common content and the second common content output to the generated common interest network.

The method may further include: providing an opinion sharing interface for sharing the user opinion on the detail page; and displaying, on the detail page, the user opinion shared through the opinion sharing interface and information associated with the selected common content.

The method may further include displaying a common content creation time, a common content expiration time, and a user recommendation count associated with at least one of the first common content and the second common content.

The method may further include: receiving a recommendation associated with the at least one of the first common content and the second common content prior to expiration of the common content expiration time associated with the at least one of the first common content and the second common content; and adjusting display of the at least one of the first common content and the second common content in response to the received recommendation.

The method may further include: displaying a gauge bar associated with at least one of the first common content and the second common content, the gauge bar indicative of a remaining common content display time for the at least one of the first common content and the second common content; wherein the gauge bar decreases in size over time at a rate greater than or equal to a reference rate.

The method may further include: receiving a recommendation associated with the at least one of the first common content and the second common content prior to disappearance of the gauge bar; and adjusting display of the at least one of the first common content and the second common content in response to the received recommendation.

The method may further include: displaying a search result corresponding to the keyword; and displaying, along with the search result, common contents associated with the common interest network, the common contents being displayed in order according to corresponding rankings, and the common contents including at least the first common content.

The locating the first common content associated with the keyword may include: identifying common contents corresponding to the keyword; and extracting the first common content from the identified common contents based on associated criterion.

The keyword may be received from a user.

The located first common content may be output to the common interest network in real time.

At least one other example embodiment provides a system for sharing information, the system comprising a memory and processing circuitry. The memory has computer-readable instructions stored therein. The processing circuitry is configured to execute the computer-readable instructions to: determine, in response to input of a keyword, whether a common interest network corresponding to the keyword exists; generate the common interest network corresponding to the keyword in response to determining that the common interest network corresponding to the keyword does not exist; locate first common content associated with the keyword; and output the located first common content to the generated common interest network corresponding to the keyword.

According to at least some example embodiments, the processing circuitry may be further configured to execute the computer-readable instructions to output, to the generated common interest network, second common content associated with the keyword, the second common content created through a content creation interface.

The processing circuitry may be further configured to execute the computer-readable instructions to: provide the content creation interface for creating the second common content; and create the second common content based on content creation information input through the content creation interface.

The processing circuitry may be further configured to execute the computer-readable instructions to cause the system to: provide a detail page associated with a common content selected from among the first common content and the second common content output to the generated common interest network, the detail page configured to share a user opinion.

The processing circuitry may be further configured to execute the computer-readable instructions to cause the system to: provide an opinion sharing interface for sharing the user opinion on the detail page; and display, on the detail page, the user opinion shared through the opinion sharing interface, and information associated with the common content.

The processing circuitry may be further configured to execute the computer-readable instructions to cause the system to: display a common content creation time, a common content expiration time, and a user recommendation count associated with at least one of the first common content and the second common content.

The processing circuitry may be further configured to execute the computer-readable instructions to cause the system to: receive a recommendation associated with the at least one of the first common content and the second common content prior to expiration of the common content expiration time associated with the at least one of the first common content and the second common content; and adjust display of the at least one of the first common content and the second common content in response to the received recommendation.

The processing circuitry may be further configured to execute the computer-readable instructions to cause the system to: display a gauge bar associated with at least one of the first common content and the second common content, the gauge bar indicative of a remaining common content display time for the at least one of the first common content and the second common content; wherein the gauge bar decreases in size over time at a rate greater than or equal to a reference rate.

The processing circuitry may be further configured to execute the computer-readable instructions to cause the system to: receive a recommendation associated with the at least one of the first common content and the second common content prior to disappearance of the gauge bar; and adjust display of the at least one of the first common content and the second common content in response to the received recommendation.

The processing circuitry may be further configured to execute the computer-readable instructions to cause the system to: display a search result corresponding to the keyword; and display, along with the search result, common contents associated with the common interest network, the common contents being displayed in order according to corresponding rankings, and the common contents including at least the first common content.

The processing circuitry may be further configured to execute the computer-readable instructions to: identify common contents corresponding to the keyword; and extract the first common content from the identified common contents based on associated criterion.

The processing circuitry may be further configured to receive the keyword from a user.

The processing circuitry may be further configured to execute the computer-readable instructions to output the located first common content to the common interest network in real time.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
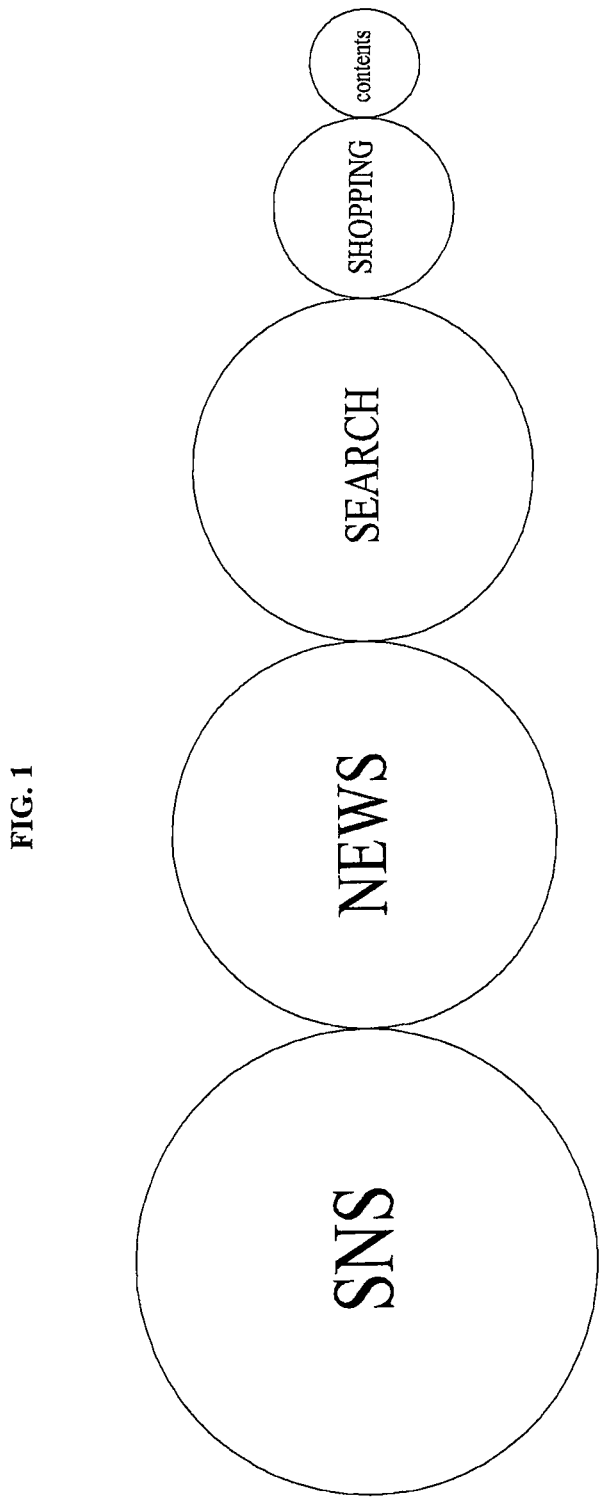
FIG. 1 illustrates an example of a common interest network environment provided at an information sharing system according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 illustrates an example of a common interest network environment provided at an information sharing system according to at least one example embodiment. The information sharing system of FIG. 1 may provide a common interest network environment of users including, for example, contents, shopping, search, news, social network service (SNS), and the like. The information sharing system may provide shopping, news, and search results through a search site, and/or enable users to form a common interest network and share information in real time, such as information transmitted and/or received at a SNS.

Figure 2:
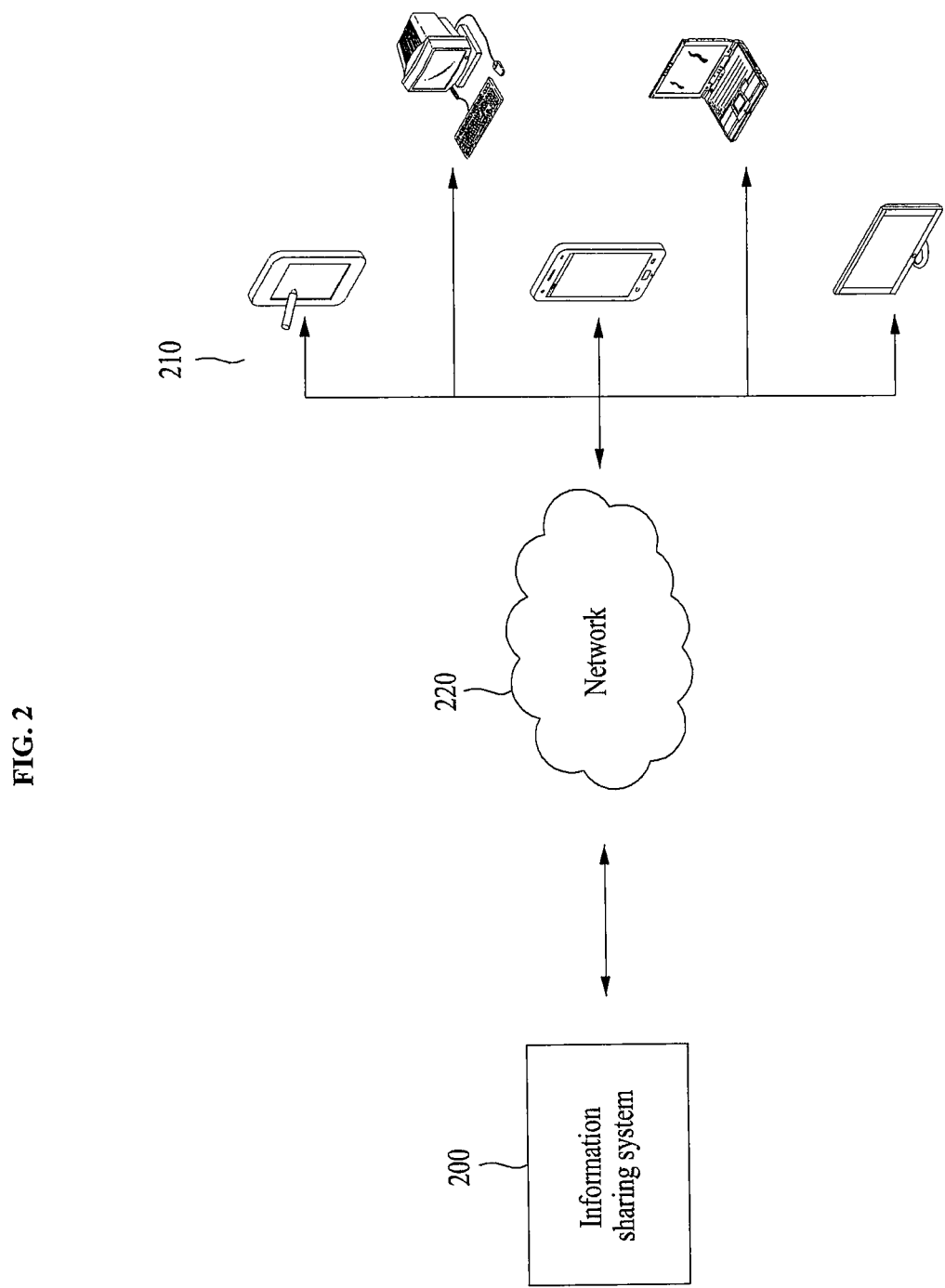
FIG. 2 illustrates example operation of an information sharing system according to at least one example embodiment.

FIG. 2 illustrates example operation of an information sharing system according to at least one example embodiment.

Referring to FIG. 2, data may be transmitted and received between an information sharing system 200 and a user terminal 210 over a network 220. A configuration of the network 220 may include a greater or lesser number of components, connections, and/or interactions than the number of components, connections, and/or interactions shown in FIG. 2.

The network 220 may provide communication links between data processing systems, computers, servers, and/or various types of apparatuses. The network 220 may refer to a world-wide collection of gateways and networks using, for example, a transmission control protocol/Internet protocol (TCP/IP) and/or a suite of protocols for mutual communication between the information sharing system 200 and the user terminal 210. In at least some example embodiments, the network 220 may include, for example, an intranet, a local area network (LAN), a wide area network (WAN), parts and/or combinations thereof. In at least some example embodiments, the network 220 may be a part of the Internet.

The user terminal 210 may be, for example, a personal computer (PC), a laptop, a smartphone, a tablet, a wearable computer, and the like. More generally, the user terminal 210 may refer to any type of terminal device capable of connecting to a website/mobile site associated with the information sharing system 200 and/or installing and executing a service exclusive application. In this example, the user terminal 210 may perform the overall service operation, such as service screen configuration, data input, data transmission and/or reception, data storage, and the like, under control of the website/mobile site and/or the exclusive application.

The information sharing system 200 may be configured on a search platform that provides a search service, and may provide an environment for sharing a common interest network at a search site to the user terminal 210 that serves as a client using the search service. Here, the information sharing system 200 may provide a content recommending function, a content information sharing function, and the like, for common content at the search site.

According to at least one example embodiment, the information sharing system 200 may be included in a platform of a search server (not shown) that provides the search service. However, example embodiments should not be limited to this example. According to at least some other example embodiments, the information sharing system 200 may be configured as a system separate from a search server. In this example, the information sharing system 200 may manage the common interest network through interaction with the search server. In at least some other example embodiments, the information sharing system 200 may be configured in the form of an application in which at least a portion of constituent components are installed on the user terminal 210, or may be configured to be included in a platform that provides a service in a client-server environment.

Figure 3:
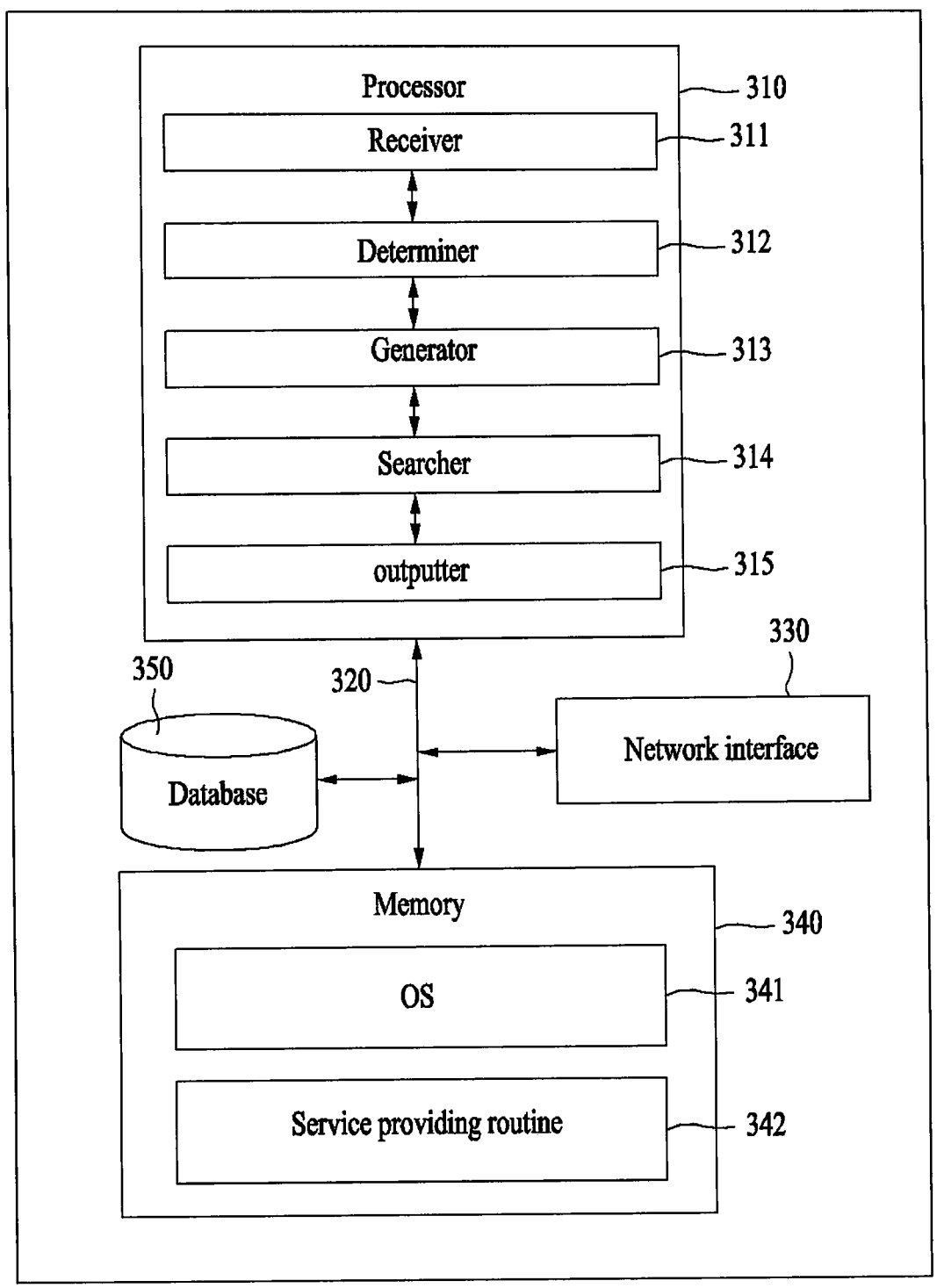
FIG. 3 is a block diagram illustrating example configuration of an information sharing system according to at least one example embodiment.

FIG. 3 is a block diagram illustrating an example configuration of an information sharing system according to at least one example embodiment.

Referring to FIG. 3, an information sharing system 300 includes: a processor 310; a bus 320; a network interface 330; a memory 340; and a database 350. In this example, the memory 340 includes an operating system (OS) 341 and a service providing routine 342. As discussed herein, the receiver, the determiner, the generator, the searcher, and the outputter may also be referred to as a receiving unit (or circuit), a determining unit (or circuit), a generating unit (or circuit), a searching unit (or circuit), and an output unit (or engine or circuit), respectively.

According to at least some other example embodiments, the information sharing system 300 may include a greater or lesser number of constituent elements than the number of constituent elements shown in FIG. 3. For example, the information sharing system 300 may include other constituent elements such as a display, a transceiver, etc.

The memory 340 may include a permanent mass storage device, such as random access memory (RAM), read only memory (ROM), a disk drive, etc., as a computer-readable storage medium. Also, program code or codes (e.g., computer-readable instructions) for the OS 341 and the service providing routine 342 may be stored in the memory 340. Such software constituent elements may be loaded from another computer-readable storage medium separate from the memory 340 using a drive mechanism (not shown). The other computer-readable storage medium may include, for example, a floppy drive, a disc, a tape, a DVD/CD-ROM drive, a memory card, etc. Software constituent elements may be loaded to the memory 340 through the network interface 330 instead of, or in addition to, the computer-readable storage medium.

The bus 320 enables communication and data transmission between the constituent elements of the information sharing system 300. The bus 320 may be configured using a high-speed serial bus, a parallel bus, a storage area network (SAN), and/or another appropriate communication technology.

The network interface 330 may be a computer hardware constituent element for connecting the information sharing system 300 to a computer network. The network interface 330 may be a network interface card (NIC), such as an Ethernet card, an optical transceiver, a wireless frequency transceiver, a combination thereof, or a different type of device capable of transmitting and receiving information. Other examples of the network interface 330 may be a wireless device including mobile computing devices, Bluetooth within a universal serial bus (USB), 3rd generation (3G), $4^{th}$ generation (4G), $5^{th}$ generation (5G), wireless fidelity (WiFi), and the like.

In at least some example embodiments, the information sharing system 300 may use the network interface 330 to wirelessly communicate with an external device, such as a server, a mobile phone, a network computing device, and the like. The network interface 330 may connect the information sharing system 300 to a computer network through a wireless and/or wired connection.

The database 350 may serve to store and maintain information (e.g., all information) required to manage common content information corresponding to a keyword and the like. For example, the database 350 may store information required to generate a common interest network associated with the keyword in real time, and may store information shared through common content created by users using the common interest network. Although FIG. 3 illustrates that the database 350 is included as part of the information sharing system 300, the database 350 may be omitted based on a system configuration and/or environment. Alternatively, all, or a portion, of the database 350 may be present as an external database configured on a system separate from the information sharing system 300.

Still referring to FIG. 3, the processor 310 may be configured to process computer-readable instructions of a computer program by performing basic arithmetic operations, logic operations, and/or input/output operations of the information sharing system 300. The computer-readable instructions may be provided from the memory 340 and/or the network interface 330 to the processor 310 through the bus 320. The processor 310 may be configured to execute program code to cause the processor 310 to perform functions described herein with regard to the receiver 311, the determiner 312, the generator 313, the searcher 314, and the outputter 315. The program code may be stored in a storage device, such as the memory 340.

In example operation, the receiver 311 may receive a keyword input from a user. The keyword may be input by the user through a peripheral device, such as a keyboard, a touch screen, etc.

In response to the input keyword, the determiner 312 may determine whether a common interest network associated with the keyword is present (e.g., exists).

The generator 313 may determine that a common interest network is absent (e.g., does not exist), and may generate the common interest network corresponding to the keyword.

The searcher 314 may search for common content including the keyword in order to output the common content to the generated common interest network. The searcher 314 may determine whether common content corresponding to the input keyword is present, and may extract the common content from among the found (e.g., located and/or identified) common contents based on a given (or alternatively, desired, preset or predetermined) criterion. For example, the searcher 314 may search for common content corresponding to a category included in the keyword based on a given (or alternatively, desired, preset or predetermined) criterion, and may extract common content relevant to (e.g., having the highest associated relevance level), or in which the keyword is most frequently used, from among the found common contents.

The outputter 315 may output the found common content to the common interest network in real time. The outputter 315 may output, to the common interest network, common content found in response to the keyword input from the user and common content created by the user through a content creation interface. The outputter 315 may provide the content creation interface so that the common interest network is able to create the common content corresponding to the input keyword, and may create common content based on content creation information input by the user through the content creation interface. The outputter 315 may output the created common content to the common interest network.

The outputter 315 may provide a detail page associated with (or about) common content selected by the user from among the common contents output to the common interest network, to share an opinion of the user. In one example, the outputter 315 may display (i) an opinion sharing interface for sharing the opinion of the user on the detail page of the selected common content, (ii) an opinion input from the user through the opinion sharing interface, and/or (iii) information about the common content, on a given (or alternatively, desired, preset or predetermined) area of the detail page.

The outputter 315 may display a common content creation time, a common content expiration time, and/or a user recommendation count, with respect to each of the output common contents. The outputter 315 may also display a gauge bar with respect to each of the output common contents. The gauge bar may decrease in size according to a remaining common content display time to indicate a remaining display time for corresponding common content.

During a remaining period of time before a common content expiration time or during a period of time in which the gauge bar of the common content is decreases, the outputter 315 may again display the recommended common content in response to a recommendation of the common content from the user.

The outputter 315 may display a search result corresponding to the keyword input from the user, and may display common contents corresponding to the common interest network on a portion of a search result area including the search result. The displayed common contents may be ranked and displayed in order according to the rankings.

Figure 4:
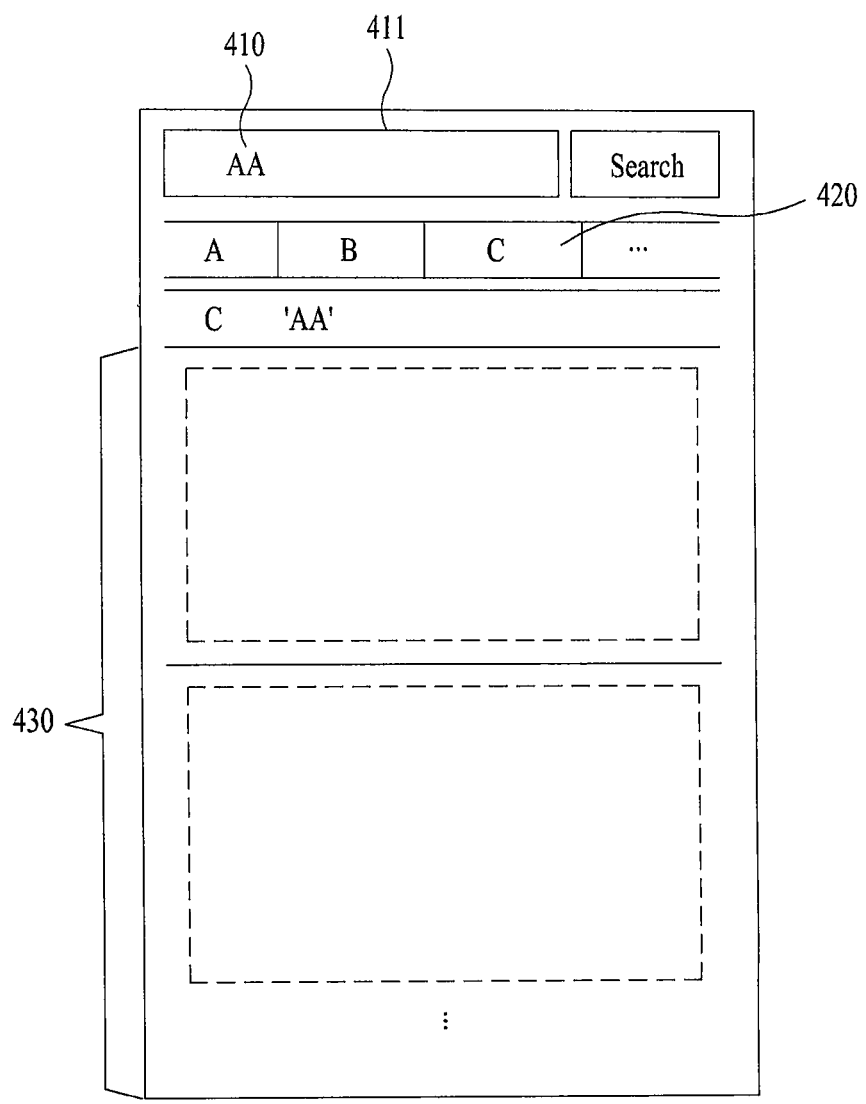
FIGS. 4 through 6 illustrate examples of operation of a common interest network in response to a keyword at an information sharing system according to at least one example embodiment.
Figure 5:
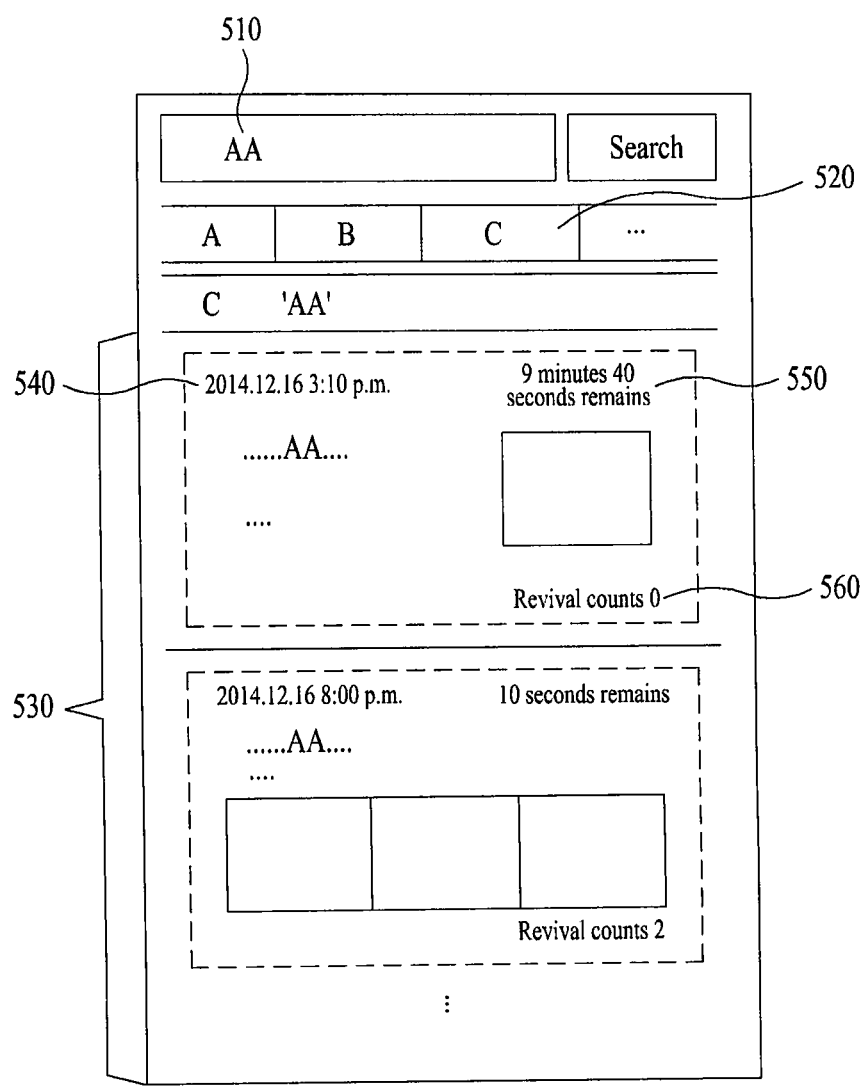
Figure 6:
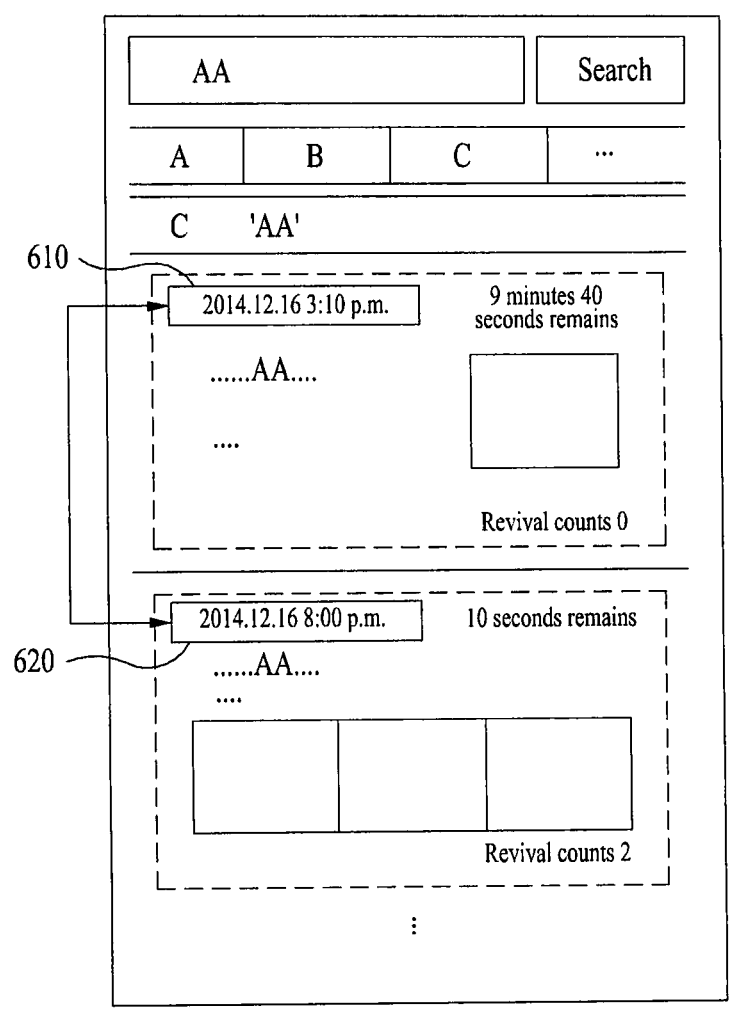

FIGS. 4 through 6 illustrate examples of operation of a common interest network in response to input of a keyword to an information sharing system according to at least one example embodiment.

The information sharing system may generate a common interest network corresponding to a keyword at an Internet site, such as a site for providing an Internet search, for example, Naver, Daum, Google, and the like, and may provide an environment in which users may share information in real time. Also, the information sharing system may generate a common interest network corresponding to a keyword at a messenger application for providing a messenger service, for example, KaKao Talk, LINE, and the like, and may provide an environment in which users may share information in real time.

Referring to FIG. 4, in an example in which the user inputs a keyword "AA" 410 into a search box 411, the information sharing system may receive the input keyword "AA" 410 and may determine whether a common interest network 420 corresponding to the keyword "AA" 410 is present. When the common interest network 420 corresponding to the keyword "AA" 410 is present, the information sharing system may search for common content including the keyword "AA" 410 to output the common content to the common interest network 420.

In this example, when the common interest network 420 corresponding to the keyword "AA" 410 is absent, the information sharing system may generate the common interest network 420 corresponding to the keyword "AA" 410, and may provide the generated common interest network 420 so that the user may create common content corresponding to the keyword "AA" 410 through a content creation interface capable of creating the common content. The information sharing system may output the found common content to the common interest network 420 in real time.

The common contents including the keyword "AA" 410 may be displayed on an area 430 in real time.

Further, as described above, the information sharing system may generate a common interest network corresponding to a keyword in a messenger application, and may provide the generated common interest network so that users may share information. For example, when the user inputs a specific keyword "soccer game," which is currently on air, into a messenger application, the information sharing system may generate a common interest network by creating a chatroom or a comment room about the "soccer game" input from the user. Users may share information about the soccer game in real time through the common interest network about the "soccer game" created at the messenger application.

The information sharing system may provide a separate tab, for example, a common interest network tab at a search site, and may provide an environment in which users may create common content corresponding to a keyword through the common interest network tab and share information. Alternatively, the information sharing system may provide a site or an application for providing a common interest network and thereby provide an environment in which a user may create common contents and share information.

FIG. 5 illustrates example operation of outputting common content including a keyword "AA" 510 to a common interest network 520. As described above, common contents may be displayed on an area 530. With respect to each of the common contents output to the common interest network 520, a common content creation time 540, a common content expiration time 550, a user recommendation count 560, etc., may be displayed. A plurality of common contents corresponding to the keyword "AA" 510 may be displayed on the area 530. For example, with respect to first common content about the keyword "AA" 510, information indicating that the first common content was created at 3:10 p.m. on Dec. 16, 2014, the first common content expires after 9 minutes and 40 seconds, and the first common content has not been recommended, may be displayed. Here, the recommendation count is indicated as revival counts in FIG. 5.

Alternatively, the information sharing system may display the common content expiration time 550 in a form of a gauge (or status) bar. In this example, the gauge bar may be provided in a form that decreases in size (e.g., is being consumed) at a given (or, alternatively, desired, predetermined or preset) rate without displaying a time. The information sharing system may display the gauge bar with a rate of decrease (or decay) greater than or less than a given (or, alternatively, desired, predetermined or preset) reference rate, in response to determining an increase in a rate at which common content corresponding to a keyword is being created.

Referring to FIG. 5, the revival count may indicate a reference for again displaying common content in response to a selection or a recommendation from the user regarding the common content. In this example, the information sharing system may display a partial area for displaying share content newly created by the user on the area 530 so that the newly created share content may be displayed together with common content having the highest recommendation count.

According to at least one example embodiment, the information sharing system may provide a user with a keyword-based popular list through a common interest network application, and may enable users to share information in response to a keyword input from the user.

Referring to FIG. 6, the information sharing system may determine rankings by comparing a common content creation times associated with the common contents output in response to a keyword "AA".

For example, the information sharing system may display common contents output in response to the keyword "AA" ranked according to common content creation times (e.g., the most recent common content creation time may be at the top, etc.). In this example, if the created common content is recommended by another user, the recommended common content may be displayed again at (or moved to) a top among the displayed common contents. In this example, the recommended common content may be ranked highest among the common contents of the common interest network. In an example in which first common content 610 about keyword "AA" was created at 3:10 p.m. on Dec. 16, 2014, and second common content 620 was created at 8:00 p.m. on Dec. 16, 2014, the second common content 620 may be ranked higher than the first common content 610, and may be displayed above (e.g., at a higher ranking than) the first common content 610. In this example, if a recommendation count for the first common content 610 is greater than a recommendation count for the second common content 620, then the first common content 610 may be ranked higher, and displayed at a higher ranking, than the second common content 620.

According to at least one example embodiment, the information sharing system may alter a display position based on a common content creation time and/or recommendation count associated with the common contents. In addition, or alternatively, rankings for displaying common contents may be modified based on a variety of criteria.

Figure 7:
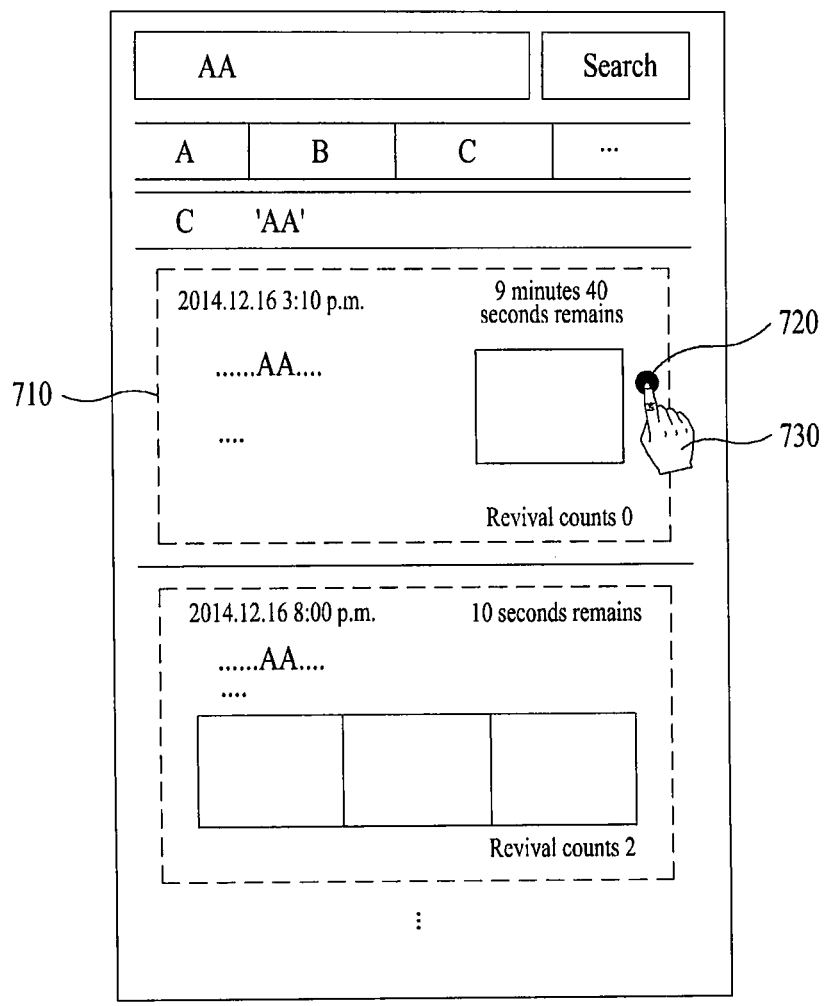
FIGS. 7 and 8 illustrate examples of sharing information through common content of an information sharing system according to at least one example embodiment.
Figure 8:
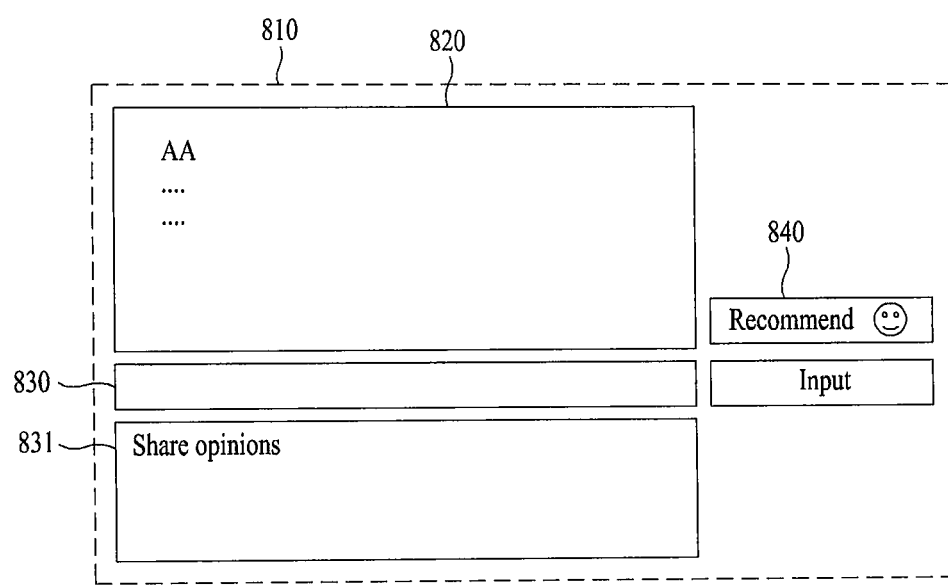

FIGS. 7 and 8 illustrate examples of sharing information through common content of an information sharing system according to at least one example embodiment.

Referring to FIG. 7, the information sharing system may provide an opinion sharing interface for sharing an opinion about common content selected by a user 730. The information sharing system may provide information about the selected common content, and at the same time (e.g., simultaneously and/or concurrently), provide the opinion sharing interface for the selected common content. In this example, the information sharing system may display an opinion input from the user 730 through the opinion sharing interface and information about the common content on a given (or, alternatively, desired or predetermined) area of a detail page of the common content.

The information sharing system may output common contents to a common interest network corresponding to, for example, a keyword "AA". In an example in which the user 730 selects first common content 710 from among the common contents output to the common interest network, the information sharing system may provide a detail page about the first common content 710. In this example, the detail page for the first common content 710 may provide information about the first common content 710 and an interface for sharing an opinion.

Referring to FIG. 8, in response to user selection of common content from among common contents output to a common interest network corresponding to a keyword, the information sharing system may display a detail page 810 for the selected common content.

For example, as described above with FIG. 7, in response to a selection 720 of the first common content 710 from among the common contents corresponding to the keyword "AA", the detail page 810 may be displayed. The detail page 810 may include an information area 820 for providing information about the keyword "AA", an input box 830 for sharing an opinion about the provided information, an opinion sharing box 831 for displaying an input opinion, and a recommend button 840 for recommending the provided information, the opinion, and the like. In this example, the opinion sharing box 831 is provided so that users may readily share opinions. Accordingly, the users may share contextual information in real time.

In an example in which the information sharing system generates a common interest network about a soap opera "D" currently on air, the common interest network about the soap opera "D" may include a variety of common contents, such as a story of the soap opera "D", casting of the soap opera "D", and the like. The user may create common content about clothing worn by character "E" through the common interest network. The information sharing system may output information about clothing worn by the character "E", initially input from the user, and may enable users to share clothing, shoes, hair, and the like, of the character "E" in real time through the detail page 810 about the clothing worn by the character "E".

Figure 9:
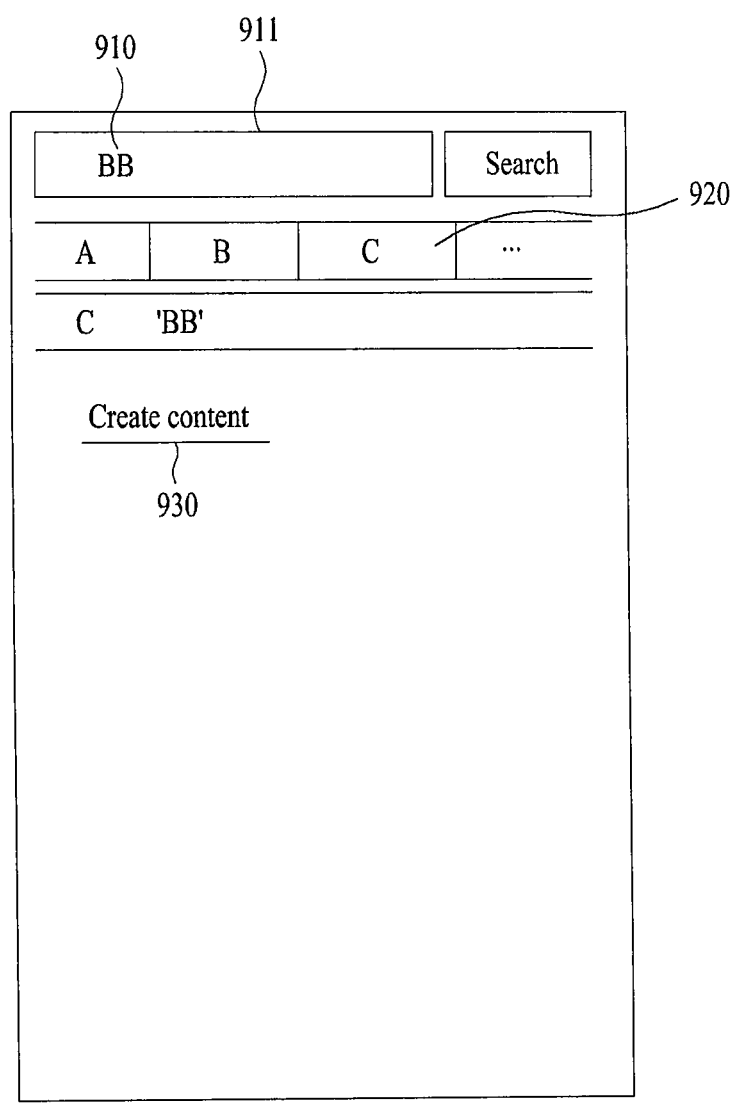
FIGS. 9 and 10 illustrate examples of creating common content at an information sharing system according to at least one example embodiment.
Figure 10:
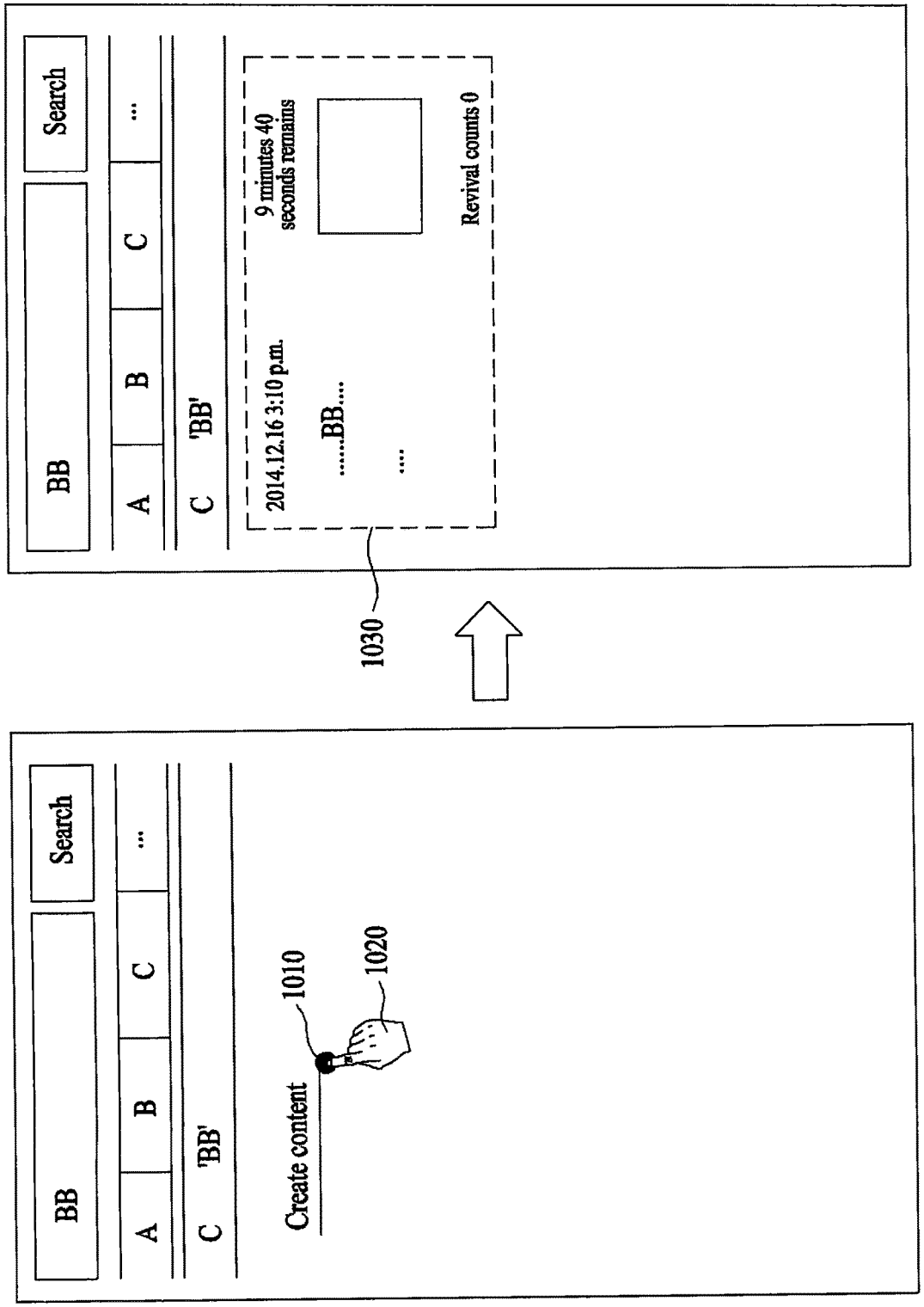

FIGS. 9 and 10 illustrate examples of creating common content at an information sharing system according to at least one example embodiment.

In response to receiving a keyword input from a user, the information sharing system may determine that a common interest network associated with a keyword is absent, and may generate a common interest network 920 corresponding to the input keyword. The information sharing system may also provide a content creation interface 930 to create common content corresponding to the input keyword.

In an example in which the user inputs a keyword "BB" 910 into a search box 911 of the information sharing system, the information sharing system may determine whether a common interest network corresponding to the keyword "BB" 910 is present. If the common interest network is not present, then the information sharing system may generate the common interest network 920 corresponding to the keyword "BB" 910. The information sharing system may also provide a "create content" interface for creating common content corresponding to the keyword "BB" 910.

Referring to FIG. 10, the information sharing system may provide a content creation interface through a common interest network based on a keyword, and may create common content based on content creation information input from the user through the content creation interface. The information sharing system may output the created common content to the common interest network.

For example, the information sharing system may provide a "create content" interface for creating common content corresponding to the keyword "BB" 910. A user 1020 may select the "content create" interface.

In response to a selection 1010, the information sharing system may provide an interface for creating common content. In this example, in response to input of information about the keyword "BB" 910 and an opinion from the user 1020 through the content creation interface, common content 1030 may be created and output to the common interest network corresponding to a keyword "BB" as shown in FIG. 10. Similarly, the common content 1030 created through the content creation interface may also be displayed together with a common content creation time, a common content expiration time, a user recommendation count, and the like.

Figure 11:
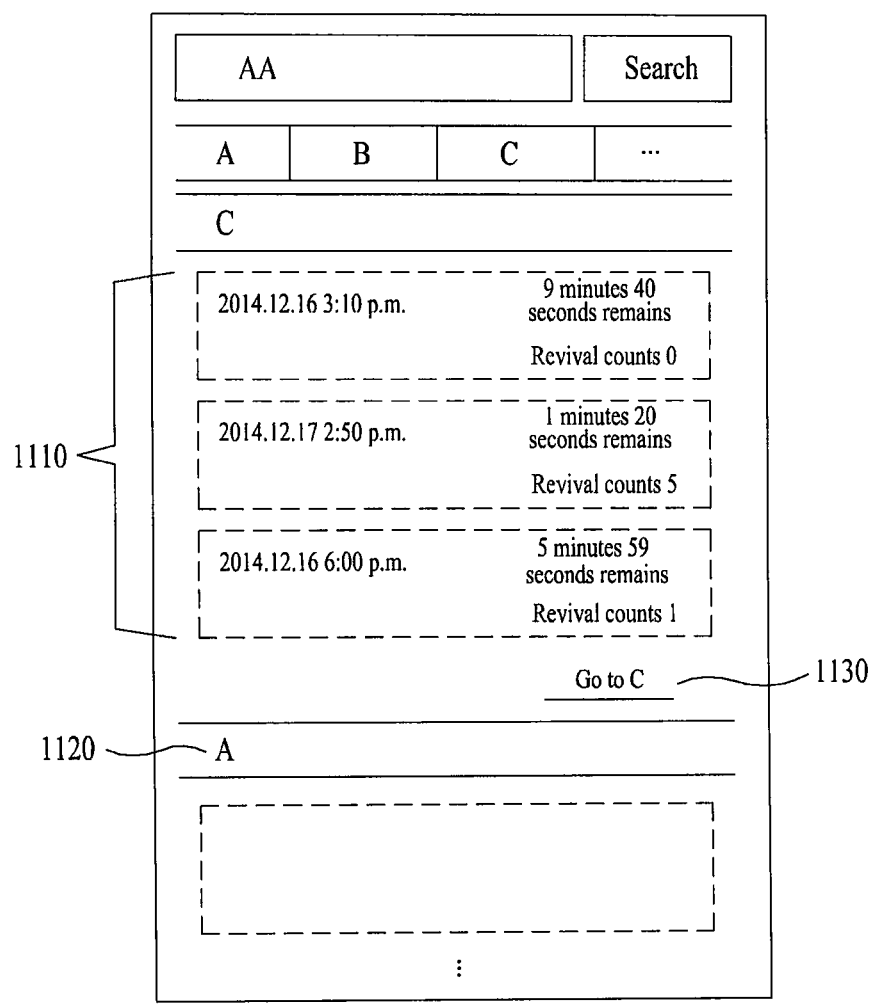
FIG. 11 illustrates example operation of a common interest network in response to a keyword at an information sharing system according to at least one example embodiment.

FIG. 11 illustrates example operation of a common interest network in response to a keyword at an information sharing system according to at least one example embodiment.

The information sharing system may display a search result corresponding to a keyword input from a user, and may display common contents corresponding to a common interest network on a portion of a search result area including the search result. The common contents may be ranked and displayed in order according to the ranking.

In an example in which a keyword "AA" is input from a user, the information sharing system may display the entire search result associated with the keyword "AA", and may display common contents corresponding to the keyword "AA" on a common interest network area 1110 corresponding to the keyword "AA". Also, the information sharing system may display, for example, news corresponding to the keyword "AA", blogs corresponding to the keyword "AA", café postings corresponding to the keyword "AA", and the like, on an area 1120. In this example, common contents to be displayed on the common interest network area 1110 corresponding to the keyword "AA" may be displayed in order according to a ranking of the common contents. The rankings may be determined based on a given (or, alternatively, desired, predetermined or preset) criterion, for example, a common content creation time, a recommendation count for the common content, and the like. The determined rankings may be applied to the entire search result.

If only common contents that rank first, second, and third are displayed on the common interest network area 1110 of a window for displaying the entire search result, the information sharing system may provide a "go to C" interface 1130 to move to common content corresponding to the keyword "AA" created at the common interest network by selecting the "go to C" interface 1130.

According to at least one example embodiment, since common content is created and displayed (e.g., immediately displayed), the information sharing system may determine reaction of users in real time and/or provide more transparent current status information through the common content being displayed in real time. Further, since a common content display time is limited, the information sharing system enables a search screen to be used more effectively on a provider side, and may enable efforts to be made to maintain the common content created by the user on a user side.

According to at least some example embodiments, the information sharing system may attract a user's attention, thereby enabling the user to draw interest of other users, based on a feature that the common content created by the user is displayed again in response to recommendation of the common content.

Figure 12:
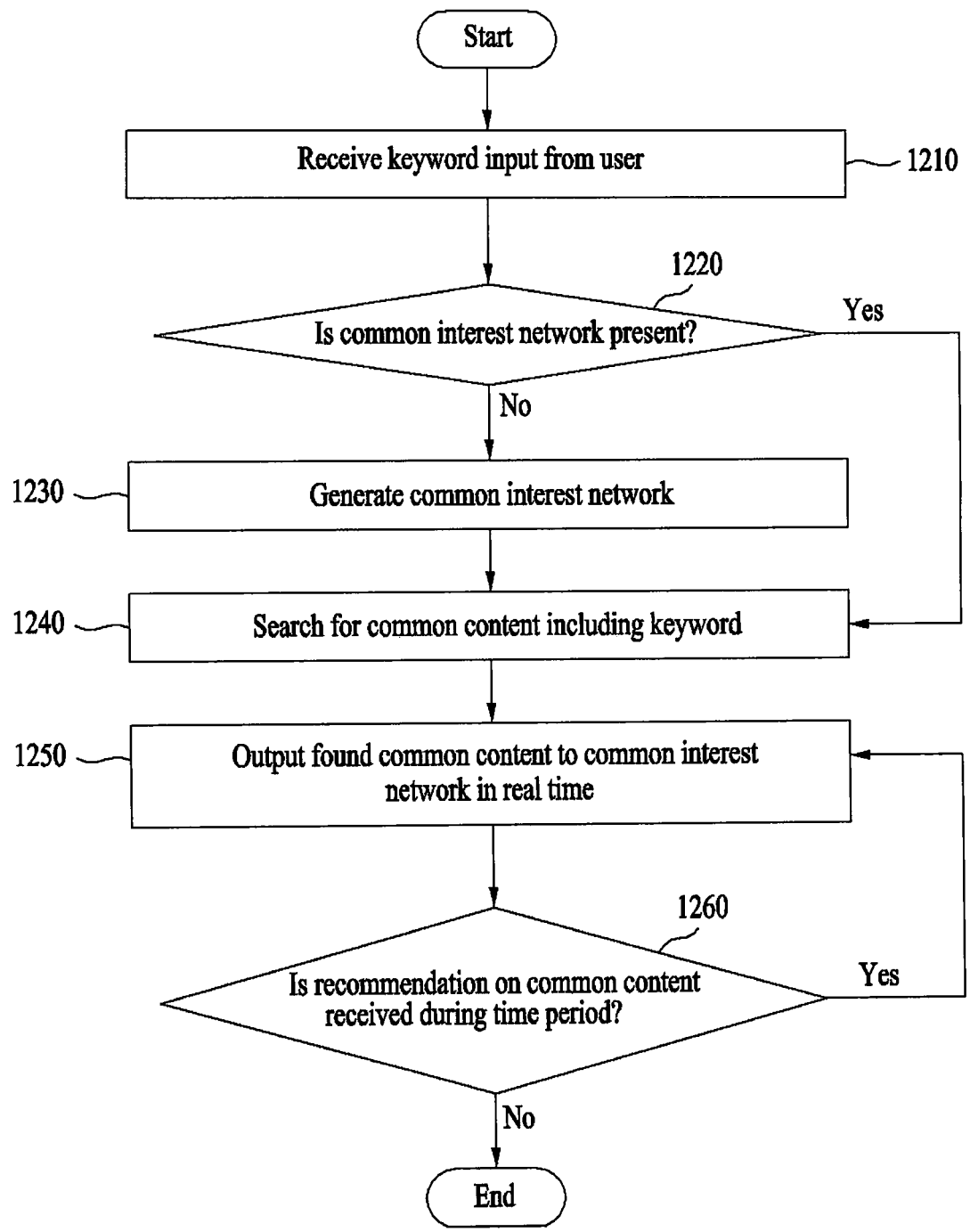
FIGS. 12 and 13 are flowcharts illustrating an information sharing method according to at least one example embodiment.
Figure 13:
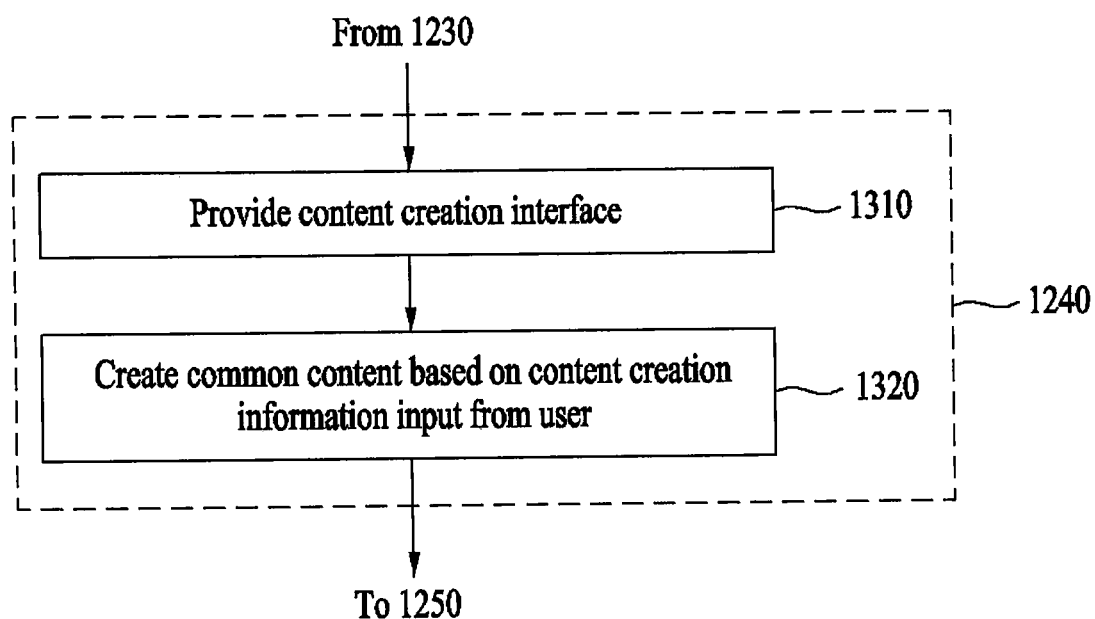

FIGS. 12 and 13 are flowcharts illustrating an information sharing method of an information sharing system according to at least one example embodiment. The method shown in FIGS. 12 and 13 may be performed in conjunction with, and will be described with regard to, the information sharing systems 200 and 300 shown in FIGS. 2 and 3, respectively. However, example embodiments should not be limited to this example.

In FIG. 12, a processor of the information sharing system may load program codes stored in a file of a program for the information sharing method to/from a memory. Referring to FIG. 12, at operation 1210, the information sharing system receives a keyword input from a user.

At operation 1220, the information sharing system determines whether a common interest network associated with the input keyword is present. For example, the information sharing system may determine whether the common interest network associated with the input keyword is present based on contents stored in a search engine, in response to receiving the keyword input from a user at the search engine.

If the information sharing system determines that the common interest network associated with the keyword is not present (absent or does not exist), then the information sharing system may generate a common interest network corresponding to the keyword at operation 1230. For example, the information sharing system may provide an interface for generating a common interest network corresponding to the keyword input from the user at the search engine. The information sharing system may provide the interface to generate the common interest content by inputting a category associated with the keyword input from the user, another keyword associated with the keyword, and the like.

The common interest network may indicate an environment in which users may create a virtual space capable of transmitting and receiving information associated with a keyword of interest and share information associated with the keyword in real time. For example, if the virtual space associated with the keyword input from a first user is created and the same keyword is received from a second user, the information sharing system provides an environment in which the first user and the second user may share information associated with the keyword in the virtual space created by the first user.

At operation 1240, the information sharing system may search for common content including the keyword to output to the generated common interest network. For example, the information sharing system may extract common content from among the found common contents including the keyword based on a given (or, alternatively, desired, predetermined or preset) criterion. An example embodiment of operation 1240 will be discussed in more detail below with regard to FIG. 13. The information sharing system may provide common content to be shared in the common interest network. For example, the common interest network may provide an opinion sharing interface for sharing the common content so that the users may share opinions about the common content.

At operation 1250, the information sharing system may output the identified (or, alternatively, located or found) common content to the common interest network in real time.

At operation 1260, the information sharing system may determine whether a recommendation for the common content has been received from the user during a given (or, alternatively, desired, predetermined, or preset) period of time (also referred to herein as a time period or time interval).

If the information sharing system determines that a recommendation for the common content has been received from the user during the given (or, alternatively, desired, predetermined, or preset) period of time at operation 1260, then the process returns to operation 1250 and the information sharing system again displays the recommended common content on the common interest network.

Returning to operation 1260, if the information sharing system determines that a recommendation for the common content has not been received from the user during the given (or, alternatively, desired, predetermined, or preset) period of time, then the information sharing system may terminate the process.

Returning now to operation 1220, if the information sharing system determines that the common interest network associated with the keyword is present, then the information sharing system may search for common content including the keyword within the existing common interest network at operation 1240. In this case, the process may omit operation 1230. Operation 1240 is performed as discussed above (and in more detail below), but with regard to at least the existing common interest network. The process then proceeds to operation 1250, and continues as discussed above.

An information sharing system according to at least some example embodiments may generate a common interest network corresponding to a keyword and provide an environment that allows users to share information in real time, thereby enhancing a processing rate and reducing a usage amount of data.

FIG. 13 illustrates a method for searching for common content (operation 1240) by an information sharing system according to at least one example embodiment.

Referring to FIG. 13, in at least one example embodiment, if the information sharing system determines that common content corresponding to the keyword is absent at operation 1220 (e.g., the information sharing system is unable to locate common content including the keyword), then the information sharing system may provide a content creation interface to create common content corresponding to the input keyword at operation 1310. The information sharing system may then create common content based on content creation information input from the user through the content creation interface at operation 1320.

Not only in a case in which the common content corresponding to the input keyword is absent, but also in a case in which the common content corresponding to the input keyword is present, the information sharing system may provide the content creation interface to create the common content. For example, in preparation for a case in which the user desires to create additional common content corresponding to the input keyword, the information sharing system may provide the content creation interface.

Figure 14:
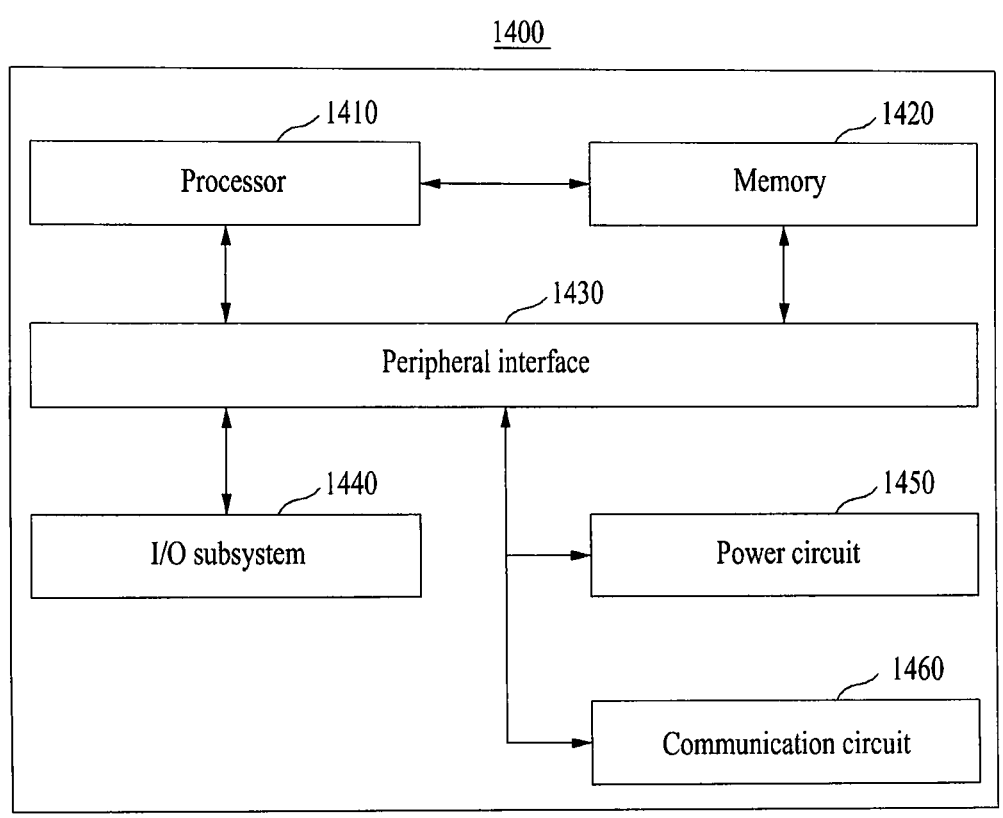
FIG. 14 is a block diagram illustrating an example configuration of a computer system according to at least one example embodiment.

FIG. 14 is a block diagram illustrating an example configuration of a computer system according to at least one example embodiment.

Referring to FIG. 14, a computer system 1400 includes: at least one processor 1410; a memory 1420; a peripheral interface 1430; an input/output (I/O) subsystem 1440; a power circuit 1450; and a communication circuit 1460. The computer system 1400 may correspond to a user terminal.

The memory 1420 may include, for example, a high-speed random access memory (HSRAM), a magnetic disk, a static random access memory (SRAM), a dynamic RAM (DRAM), read only memory (ROM), a flash memory, a non-volatile memory, etc. The memory 1420 may include a software module, an instruction set, or a variety of data required for operation of the computer system 1400. Here, access from another component such as the processor 1410 and the peripheral interface 1430 to the memory 1420 may be controlled by the processor 1410.

The peripheral interface 1430 may couple an input device and/or output device of the computer system 1400 with the processor 1410 and the memory 1420. The processor 1410 may perform a variety of functions for the computer system 1400 and process data by executing the software module and/or the instruction set stored in the memory 1420.

The I/O subsystem 1440 may couple various I/O peripheral devices with the peripheral interface 1430. For example, the I/O subsystem 1440 may include a controller for coupling the peripheral interface 1430 and a peripheral device, such as a monitor, a keyboard, a mouse, a printer, a touch screen and/or a sensor depending on a necessity. The I/O peripheral devices may be coupled with the peripheral interface 1430 without using the I/O subsystem 1440.

The power circuit 1450 may supply power to all, or a portion, of components of a terminal. For example, the power circuit 1450 may include a power management system, at least one power source such as a battery and alternating current (AC) circuit, a charge system, a power failure detection circuit, a power converter or inverter, a power status indicator, and/or other components for creating, managing and/or distributing power.

The communication circuit 1460 enables communication with another computer system using at least one external port. Alternatively, as described above, the communication circuit 1460 may enable communication with another computer system by including a radio frequency (RF) circuit, and thereby transmitting and receiving an RF signal known as an electromagnetic signal.

The example embodiment of FIG. 14 is only an example of the computer system 1400. The computer system 1400 may have a configuration and/or an arrangement in which a portion of the components illustrated in FIG. 14 is/are omitted, further components not illustrated in FIG. 14 are included, or two or more components are coupled together. For example, a computer system for a communication terminal of a mobile environment may further include a touch screen, a sensor, and the like, in addition to the components of FIG. 14. A circuit for RF communication using a variety of communication methods, for example, wireless fidelity (Wi-Fi), 3rd generation (3G), 4th generation (4G), 5th generation (5G) long term evolution (LTE), Bluetooth, near field communication (NFC), and ZigBee, may be included in the communication circuit 1460. Components that may be included in the computer system 1400 may be configured as hardware that includes one or more integrated circuits specified for at least one signal processing or application, software, or a combination of hardware and software.

The methods according to at least one example embodiment may be configured as program instructions executable through a variety of computer systems and recorded in non-transitory computer-readable media. In particular, for example, a program according to the example embodiments may be configured as a PC-based program or an application exclusive for a mobile terminal. A messenger application according to at least one example embodiment may be configured in an independently operating program form or an in-app form of a specific application to be operable on the specific application. Also, the application may be installed in a user terminal through a file provided from the file distribution system. For example, the file distribution system may include a file transmitter (not shown) to transmit the file in response to a request from the user terminal.

As described above, according to at least one example embodiment, the information sharing system may create and/or provide common content based on a common interest network corresponding to a keyword, thereby enabling users to share information more quickly in real time. Also, the information sharing system according to at least some example embodiments may enable information to be shared intuitively and/or truly between users through the common interest network.

As discussed similarly above, the units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

As discussed similarly above, the software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

At least some example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of sharing information, the method comprising:
    first receiving, by at least one processor, input of a keyword to a search engine;
    determining, by the at least one processor, in response to the first receiving, whether a common interest network corresponding to the keyword exists;
    generating, by the at least one processor, the common interest network corresponding to the keyword in response to determining that the common interest network corresponding to the keyword does not exist, the common interest network generated within a messenger application providing a messenger service;
    attempting, by the at least one processor, to locate first common content associated with the keyword via the search engine in response to the first receiving, the attempting to locate first common content performed after the generating the common interest network;
    first outputting, by the at least one processor, the first common content to the generated common interest network corresponding to the keyword in response to locating the first common content via the search engine based on the attempting to locate first common content;
    second receiving, by the at least one processor, input of the keyword to the search engine;
    second outputting, by the at least one processor, a search result screen in response to the second receiving, a first portion of the search result screen including search results corresponding to the keyword, a second portion of the search result screen including a first interface and a subset of the first common content; and
    third outputting, by the at least one processor, the first common content in response to a selection of the first interface.

2. The method of claim 1, further comprising:
    outputting, to the common interest network, second common content associated with the keyword, the second common content created through a content creation interface.

3. The method of claim 2, further comprising:
    providing the content creation interface for creating the second common content; and
    creating the second common content based on content creation information input through the content creation interface.

4. The method of claim 2, further comprising:
    sharing a user opinion by displaying a detail page associated with common content selected from among the first common content and the second common content output to the common interest network.

5. The method of claim 4, further comprising:
    providing an opinion sharing interface for sharing the user opinion on the detail page; and displaying, on the detail page, the user opinion shared through the opinion sharing interface and information associated with the common content.

6. The method of claim 2, further comprising:
displaying a common content creation time, a common content expiration time, and a user recommendation count associated with at least one of the first common content or the second common content.

7. The method according to claim 6, further comprising:
receiving a recommendation associated with the at least one of the first common content or the second common content prior to expiration of the common content expiration time associated with the at least one of the first common content or the second common content; and
adjusting display of the at least one of the first common content or the second common content in response to the recommendation.

8. The method of claim 2, further comprising:
displaying a gauge bar associated with at least one of the first common content or the second common content, the gauge bar indicative of a remaining common content display time for the at least one of the first common content or the second common content, wherein
the gauge bar decreases in size over time at a rate greater than or equal to a reference rate.

9. The method of claim 8, further comprising:
receiving a recommendation associated with the at least one of the first common content or the second common content prior to disappearance of the gauge bar; and
adjusting display of the at least one of the first common content or the second common content in response to the recommendation.

10. The method of claim 1, further comprising:
displaying a search result corresponding to the keyword; and
displaying, along with the search result, common contents associated with the common interest network, the common contents being displayed in order according to corresponding rankings, and the common contents including at least the first common content.

11. The method of claim 1, wherein the attempting to locate the first common content associated with the keyword comprises:
identifying common contents corresponding to the keyword; and
extracting the first common content from the common contents based on associated criterion.

12. The method of claim 1, wherein the first receiving receives the input of the keyword from a user.

13. The method of claim 1, wherein the first outputting outputs the first common content to the common interest network in real time.

14. The method of claim 1, further comprising:
receiving content creation information in response to determining an attempt to locate the first common content via the search engine has failed.

15. A non-transitory computer-readable recording medium including instructions that, when executed, control a computer system to perform a method for sharing information, the method comprising:
first receiving input of a keyword to a search engine;
determining, in response to the first receiving, whether a common interest network corresponding to the keyword exists;
generating the common interest network corresponding to the keyword in response to determining that the common interest network corresponding to the keyword does not exist, the common interest network generated within a messenger application providing a messenger service;
attempting to locate first common content associated with the keyword via the search engine in response to the first receiving, the attempting to locate first common content performed after the generating the common interest network;
first outputting the first common content to the generated common interest network corresponding to the keyword in response to locating the first common content via the search engine based on the attempting to locate first common content;
second receiving input of the keyword to the search engine;
second outputting a search result screen in response to the second receiving, a first portion of the search result screen including search results corresponding to the keyword, a second portion of the search result screen including a first interface and a subset of the first common content; and
third outputting the first common content in response to a selection of the first interface.

16. A system for sharing information, the system comprising:
a memory having computer-readable instructions stored therein; and
processing circuitry configured to execute the computer-readable instructions to
first receive input of a keyword to a search engine,
determine, in response to first reception of the input of the keyword, whether a common interest network corresponding to the keyword exists,
generate the common interest network corresponding to the keyword in response to determining that the common interest network corresponding to the keyword does not exist, the common interest network generated within a messenger application providing a messenger service,
attempt to locate first common content associated with the keyword via the search engine in response to the first reception of the input of the keyword, the attempt to locate the first common content performed after the generation of the common interest network,
first output the first common content to the generated common interest network corresponding to the keyword in response to locating the first common content via the search engine based on the attempt to locate the first common content,
second receive input of the keyword to the search engine,
second output a search result screen in response to the second reception of the input of the keyword, a first portion of the search result screen including search results corresponding to the keyword, a second portion of the search result screen including a first interface and a subset of the first common content, and
third output the first common content in response to a selection of the first interface.

17. The system of claim 16, wherein the processing circuitry is further configured to execute the computer-readable instructions to output, to the common interest network, second common content associated with the keyword, the second common content created through a content creation interface.

18. The system of claim 17, wherein the processing circuitry is further configured to execute the computer-readable instructions to:
provide the content creation interface for creating the second common content; and
create the second common content based on content creation information input through the content creation interface.

19. The system of claim 17, wherein the processing circuitry is further configured to execute the computer-readable instructions to cause the system to:
provide a detail page associated with a common content selected from among the first common content and the second common content output to the common interest network, the detail page configured to share a user opinion.

20. The system of claim 19, wherein the processing circuitry is further configured to execute the computer-readable instructions to cause the system to:
provide an opinion sharing interface for sharing the user opinion on the detail page; and
display, on the detail page, the user opinion shared through the opinion sharing interface, and information associated with the common content.

21. The system of claim 17, wherein the processing circuitry is further configured to execute the computer-readable instructions to cause the system to:
display a common content creation time, a common content expiration time, and a user recommendation count associated with at least one of the first common content or the second common content.

22. The system of claim 21, wherein the processing circuitry is further configured to execute the computer-readable instructions to cause the system to:
receive a recommendation associated with the at least one of the first common content or the second common content prior to expiration of the common content expiration time associated with the at least one of the first common content or the second common content; and
adjust display of the at least one of the first common content or the second common content in response to the recommendation.

23. The system of claim 17, wherein the processing circuitry is further configured to execute the computer-readable instructions to cause the system to:
display a gauge bar associated with at least one of the first common content or the second common content, the gauge bar indicative of a remaining common content display time for the at least one of the first common content or the second common content, wherein
the gauge bar decreases in size over time at a rate greater than or equal to a reference rate.

24. The system according to claim 23, wherein the processing circuitry is further configured to execute the computer-readable instructions to cause the system to:
receive a recommendation associated with the at least one of the first common content or the second common content prior to disappearance of the gauge bar; and
adjust display of the at least one of the first common content or the second common content in response to the recommendation.

25. The system of claim 16, wherein the processing circuitry is further configured to execute the computer-readable instructions to cause the system to:
display a search result corresponding to the keyword; and
display, along with the search result, common contents associated with the common interest network, the common contents being displayed in order according to corresponding rankings, and the common contents including at least the first common content.

26. The system of claim 16, wherein the processing circuitry is further configured to execute the computer-readable instructions to:
identify common contents corresponding to the keyword; and
extract the first common content from the common contents based on associated criterion.

27. The system of claim 16, wherein the processing circuitry is further configured to receive input of the keyword from a user.

28. The system of claim 16, wherein the processing circuitry is further configured to execute the computer-readable instructions to output the first common content to the common interest network in real time.

* * * * *